Patented Jan. 9, 1951

2,537,626

UNITED STATES PATENT OFFICE 2,537,626

INTERPOLYMERS OF ISOBUTENE AND ACRYLONITRILE

Kenneth C. Eberly, Akron, Ohio, and Robert J. Reid, Fair Lawn, N. J., assignors to The Firestone Tire & Rubber Company, Akron, Ohio, a corporation of Ohio No Drawing. Application December 13, 1944, Serial No. 568,067

6 Claims. (Cl. 260—80.5)

This invention relates to resinous interpolymers of isobutene and acrylonitrile, and to a process for making the same.

Isobutene is obtainable in large quantities in connection with the refinement of petroleum, and hence affords a prospectively cheap and abundant unsaturated source-material for the production of resinous polymers. Unfortunately isobutene is not readily polymerizable or interpolymerizable by ordinary methods. The material has, indeed, been polymerized by the use of ionic catalysts to yield useful, but relatively inferior, rubbery substances. However, no high grade resinous materials have hitherto been made from isobutene.

Acrylonitrile is likewise a prospectively abundant unsaturated source material for the production of synthetic resins. Acrylonitrile resins heretofore produced, however, have been too hard and brittle for any practical use.

Accordingly it is an object of this invention to provide novel and useful polymeric resins from isobutene and acrylonitrile.

Another object is to provide novel and useful resinous interpolymers of isobutene and acrylonitrile.

A further object is to provide such interpolymers which have unique properties of resistance to solvents and oils, adapting them for use as containers and container linings for a wide variety of commodities.

A still further object is to provide a process for the manufacture of such resins.

The above and other objects are secured, in accordance with this invention, by the interpolymerization, in aqueous emulsion and in the presence of a peroxidic catalyst, of mixtures containing isobutene and acrylonitrile. The mixtures interpolymerize smoothly and rapidly to yield resinous polymers having unique properties adapting them to varied uses. This ready interpolymerization is surprising, in view of the impossibility of polymerizing unmixed isobutene by emulsion methods, and in further view of the reluctance of isobutene to interpolymerize, either in emulsion or in any other system, with the majority of compounds which would ordinarily suggest themselves for the purpose.

The proportions of isobutene and of acrylonitrile supplied to the polymerization reaction of this invention may be varied within wide limits, bearing in mind the fact, as will be seen hereinafter from Table I (item 1) that the reaction is retarded by any large excess of the isobutene. Likewise, the acceptance of isobutene into the interpolymer is abruptly inelastic at the equimolecular ratio (see Table I, cf. items 1 and 6) suggesting a largely heteropolymeric mechanism. Accordingly, there will usually be no advantage in employing more than about 75% of isobutene, on the basis of total monomers, since yields drop off rapidly above this ratio without any greatly increased acceptance of isobutene into the polymer. Likewise, increased amounts of isobutene in the polymerization mass result in decreased molecular weight in the resinous product. However, if it is desired, for one reason or another, to force a maximum of isobutene into the interpolymer, polymerizations can be conducted upon mixtures containing as high as 90% isobutene. At the other end of the scale, a useful improvement in properties, over pure polyacrylonitrile, may be obtained by the polymerization of mixtures containing as low as 10% isobutene. The interpolymers will correspondingly contain from about 10% to about 60%, preferably from about 20% to about 50%, of the elements of isobutene, based on the total weight of the elements of isobutene and acrylonitrile in the interpolymer, and exclusive of any other ingredients interpolymerized therewith as hereinafter described.

As media for the emulsion polymerizations of this invention there may be employed aqueous solutions of any suitable emulsifying agents, such as organic alkali metal sulfates and sulfonates on the order of the higher fatty sulfates and sulfonates; higher fatty esters, amides, and ethers of groups bearing sulfate and sulfonic groups; aromatic and alkylated aromatic sulfonates; and the like. There may also be employed the fatty acid alkali metal soaps; cationic surface active agents such as the fatty amines and amido-amines; and non-ionic surface active agents such as the condensed glycols and polyvinyl alcohol. The aqueous media may contain upwards of about 0.5% and preferably from 1% to 3% of the emulsifying agents, depending on the effectiveness of the specific emulsifying agents employed, and also upon the desired state of the final product; thus, if it is desired that the final product shall be a stable latex, more emulsifier will be employed than if a granular or lumpy product is acceptable.

In general, a sufficient amount of the aqueous emulsifying medium is employed to provide a conveniently workable polymerization mass, this quantity being upwards of 75%, and preferably about 100%, based on the weight of monomers. 200% or more may be employed, but will usually be found unnecessary and wasteful of space in the reaction equipment.

Any of the usual oxygenating catalysts may be incorporated into the polymerization mass to promote the reaction, such catalysts being exemplified in hydrogen peroxide, per-salts on the order of potassium persulfate and sodium perborate, organic acid peroxides such as benzoyl peroxide and peracetic acid, and other similar compounds. The amount of catalyst used may vary from about 0.5 to about 5.0%, based on the weight of monomers, the greater quantities resulting in higher yields in any given time, at the expense of some reduction in average molecular weight of the product. The use of approximately 1.0% of catalyst, based on the weight of monomers, will ordinarily be found most suitable.

The interpolymerizations of this invention may be carried out at temperatures varying from about 30° to about 80° C. At the lower temperatures, the reaction proceeds slowly, with formation of higher molecular weight polymers and conversely, at higher temperatures the reaction proceeds rapidly with formation of polymers of somewhat lower molecular weight. A good balance between economy of operation and quality of product will be found in a preferred range of from about 40° to about 65° C. Under these conditions, the reaction will proceed substantially to its maximum conversion (under favorable conditions, about 70%) in approximately forty-eight hours. The unreacted monomers then remaining may be suitably recovered and recycled.

The polymerization process of this invention may be carried out in various types of apparatus. Since the constituents are gaseous under the preferred conditions of reaction, the polymerization must be carried out under pressure. For the production of small lots of resin, the ingredients may be sealed up in a bomb or other suitable vessel, and mounted in an appropriate tumbling or shaking apparatus. Large scale operations are preferably carried on in stationary autoclaves provided with suitable rotary agitating means in the interior thereof.

In addition to simple binary interpolymers of isobutene and acrylonitrile, this invention also contemplates the production of ternary and even more complex interpolymers by the inclusion, into the polymerization mass, of other monomers, such as butadiene, methyl methacrylate, styrene and like polymerizable unsaturated compounds. As much as 50%, based on the total weight of monomers, of such extraneous monomers, may be incorporated without interfering with the inclusion of the isobutene into the interpolymer.

The interpolymers of isobutene and acrylonitrile of this invention are clear, hard, flexible and, especially where the catalyst employed is a per-salt, highly solvent-resistant. However, even the solvent-resistant modifications are sufficiently soluble in a few convenient special solvents—acetonitrile, acetone, cyclohexanone, nitroparaffins, alkyl cyanides, and the like—for purposes of fabric coating, film and fiber casting, and like fabrication processes. The resins are thermoplastic and may be worked up into various products by extrusion, injection molding, calendering, friction-coating and other appropriate processes. Though incompatible with many of the common types of plasticizers, the resins of this invention may be satisfactorily plasticized by the incorporation of special plasticizers such as the aryl sulfonamides, nitroparaffins, aromatic nitro esters and others. The products are of especial use in solvent resistant containers and container linings.

With the foregoing general discussion in mind, there are given herewith detailed examples of the practice of this invention. All parts given are by weight.

EXAMPLE I

| | Parts |
|---|---|
| Isobutene | 90, 75, or 50 |
| Acrylonitrile (correspondingly) | 10, 25, or 50 |
| Aqueous emulsifying medium | 100, 150, 200, or 300 |
| Catalyst | As per Table I |

A series of polymerizations were run in accordance with the foregoing schedule, using the isobutene and acrylonitrile in proportions such that their mixture contained 90, 75 or 50% of isobutene, based on the total of isobutene and acrylonitrile, and employing the other ingredients in various combinations as indicated. In each run the ingredients, suitably chilled to prevent loss of volatile constituents, were sealed up in pressure bottles, and the bottles placed in an apparatus arranged to agitate the bottles in a water bath maintained at the temperature selected for that run. During the polymerization, a latex dispersion of the polymer formed in the bottles, and also, in some cases, a certain amount of coagulated polymer. At the conclusion of the run, the bottles were cautiously opened, the contained latex coagulated by treatment with ethanol, or if necessary, with hydrochloric acid, washed, and dried. Particulars of the several runs are set forth in Table I.

Table I

| Run No. | Isobutene, Per Cent | Catalyst Type | Catalyst Per Cent | Aqueous Medium Type | Aqueous Medium Per Cent | Temp., °C. | Time, hours | Yield, Per Cent | Mol. Per Cent Isobutene in product |
|---|---|---|---|---|---|---|---|---|---|
| 1 | 90 | $K_2S_2O_8$ / $H_2O_2$ | 0.8 / .5 | note A | 100 | 40 | 96 | 10 | 44 |
| 2 | 90 | $K_2S_2O_8$ / $H_2O_2$ | 0.8 / 0.7 | ..do | 100 | 50 | 144 | 12 | 51 |
| 3 | 75 | $K_2S_2O_8$ / $H_2O_2$ | 0.7 / 0.7 | ..do | 100 | 50 | 138 | 43 | 45.5 |
| 4 | 75 | $K_2S_2O_8$ / $H_2O_2$ | 0.7 / .4 | ..do | 100 | 40 | 96 | 33 | 41 |
| 5 | 75 | $K_2S_2O_8$ / $H_2O_2$ | 0.7 / .4 | ..do | 100 | 50 | 166 | 32 | 40 |
| 6 | 50 | $K_2S_2O_8$ / $H_2O_2$ | 0.7 / .4 | ..do | 100 | 40 | 96 | 78 | 37 |
| 7 | 50 | $K_2S_2O_8$ / $H_2O_2$ | 0.7 / .4 | ..do | 100 | 35 | 137 | 58 | 33 |
| 8 | 50 | $K_2S_2O_8$ | 0.75 | ..do | 100 | 50 | 69 | | |
| 9 | 50 | benzoyl peroxide | 1 | ..do | 150 | 50 | 17 | 8 | |
| 10 | 50 | ..do | 1 | ..do | 150 | 50 | 41 | 26 | |
| 11 | 50 | ..do | 1 | note B | 150 | 50 | 41 | 26.5 | |
| 12 | 50 | ..do | 1 | ..do | 300 | 50 | 41 | 26.5 | 33 |
| 13 | 50 | ..do | 2 | ..do | 200 | 50 | 40 | 42 | |
| 14 | 50 | $K_2S_2O_8$ | 1 | ..do | 150 | 50 | 19 | 28.6 | |
| 15 | 50 | ..do | 5 | ..do | 200 | 50 | 41 | 55.7 | 25 |
| 16 | 75 | ..do | 1 | note C | 200 | 60 | 40 | 50 | |
| 17 | 50 | benzoyl peroxide | 1 | note B | 200 | 50 | 40 | 50 | |

Note A—2½% aqueous solution of mixed lauryl and myristyl sodium sulfates.
Note B—1% aqueous solution of mixed lauryl and myristyl sodium sulfates.
Note C—2% aqueous solution of mixed sodium oleate and stearate.

The relative molecular weights, based on viscosity data, of the resins obtained in run Nos. 1, 3 and 5 respectively were 27,000, 53,000 and 74,000, showing that increasing amounts of acrylonitrile in the monomeric mixture result in increased molecular weight. It will likewise be noticed (items 1–8) that it is difficult to introduce more than equimolecular proportions of isobutene into the interpolymer, which would suggest a largely heteropolymeric type of reaction. The resin produced in accordance with run No. 15 was highly resistant to ordinary solvents, but was nevertheless sufficiently thermoplastic for hot molding processes. The product was soluble in special solvents such as acetonitrile and the like.

EXAMPLE II

Ternary interpolymer

| | Parts |
|---|---|
| Isobutene | 65 |
| Acrylonitrile | 25 |
| Methyl methacrylate | 10 |
| Potassium persulfate | 0.4 |
| Hydrogen peroxide (30% aqueous solution) | 1.0 |
| Mixed lauryl and myristyl sodium sulfates | 5.0 |
| Water | 200 |

The foregoing ingredients were subjected to the procedure of Example I. The temperature of the polymerization was 50° C. and the polymerization was continued for forty-nine hours. There was obtained a 57% yield of a tough, hard, thermoplastic resin.

EXAMPLE III

Ternary interpolymer

| | Parts |
|---|---|
| Isobutene | 34 |
| Acrylonitrile | 33 |
| Butadiene 1,3 | 33 |
| Potassium persulfate | 0.4 |
| Hydrogen peroxide (30% aqueous solution) | 1.0 |
| Mixed lauryl and myristyl sodium sulfates | 5.0 |
| Water | 200 |

The foregoing ingredients were subjected to the procedure of Example I. The polymerization was carried out at 50° C. for forty-one hours. There was obtained a 70% yield of a rubbery polymer.

EXAMPLE IV

| | Parts |
|---|---|
| Isobutene | 50 |
| Acrylonitrile | 50 |
| Benzoyl peroxide | 1 |
| Mixed lauryl and myristyl sodium sulfates | 2 |
| Water | 225 |

The foregoing ingredients were charged under pressure into a stationary polymerization autoclave provided with a rotary stirring apparatus and with a jet for the introduction of steam into the interior of the autoclave. The temperature was adjusted to 50° C. and the polymerization carried on for forty hours with continuous stirring. At the end of this time, the autoclave was vented to a recovery system and a current of steam blown through the mass to sweep out the unreacted monomers. The polymerization mass was removed from the autoclave, and coagulated by the addition of alum. The coagulum was separated from the aqueous phase by filtration, washed on the filter, and dried. There was obtained a granular polymer which was insoluble in hydrocarbons, chlorinated hydrocarbons, alcohols, ethers, esters and ketones, with the exception of acetone. The resin was soluble in nitromethane and other nitroparaffins. The resin was incompatible with the usual plasticizers but was successfully plasticized with 2-nitro isobutyl phthalate, and formed into films which, by virtue of their oil resistance, were admirably adapted as wrapping materials for butter, lard, greases and the like. Paper coated from an acetone solution of this resin to a dried coating thickness of .001" had excellent resistance to solvents and oils, suggesting the use of such coated papers as containers for milk, solvents, liquid fuels, and the like.

EXAMPLE V

| | Parts |
|---|---|
| Isobutene | 50 |
| Acrylonitrile | 50 |
| Potassium persulfate | 5 |
| Water | 200 |
| Mixed lauryl and myristyl sodium sulfates | 2 |

The foregoing ingredients were subjected to the process of Example IV. The resultant granular resin was even more highly resistant to solvents than the resin produced in accordance with Examples IV, being insoluble in acetone and the nitroparaffins. The resin was, however, soluble in acetonitrile, and a flexible wrapping film suitable for packaging butter, oils, greases, etc., was cast from such a solution. The material was thermoplastic, and an oil line fitting was compression molded therefrom.

From the foregoing general description and detailed examples, it is evident that this invention provides novel and useful resins which are susceptible of fabrication by the usual procedures of hot molding, extruding, calendering, friction coating, solvent coating, film casting and the like. Although resistant to solvents in general, the resins of this invention are readily soluble in a few relatively cheap solvents such as acetone, acetonitrile and the nitroparaffins, permitting them to be used in coating compositions and to be fabricated by processes involving solvents. The resins may be worked up into molded articles, especially mechanical fittings which will be exposed to solvent action; cast or calendered films, especially for use as wrappings for oily and greasy materials such as butter, lard, grease, etc.; and coated fabrics and papers for use in contact with solvents, as for instance in containers for solvents, liquid fuels, oils and the like. The resins are manufactured from the relatively cheap and abundant isobutene and acrylonitrile, by the use of processes which are cheaply and readily carried out.

What is claimed is:

1. A resinous interpolymer exclusively of isobutene, acrylonitrile, and methyl methacrylate wherein the elements of isobutene are present to the extent of from about 10% to about 60%, based on the total weights of isobutene and of acrylonitrile in said interpolymer, and wherein the elements of methyl methacrylate are present to the extent of not more than 50%, based on the weight of the elements of all monomers in said interpolymer.

2. A rubbery interpolymer exclusively of isobutene, acrylonitrile and butadiene-1,3, wherein the elements of isobutene are present to the extent of from about 10% to about 60%, based on the total weights of the elements of isobutene and of acrylonitrile in said interpolymer, and wherein the elements of butadiene are present to the extent of not more than about 50%, based on the total weights of the elements of all monomers in said interpolymer.

3. Process which comprises interpolymerizing, in aqueous emulsion, a mixture solely of isobutene, acrylonitrile, and methyl methacrylate said isobutene being present in the mixture to the extent of from about 10% to about 90%, based on the total weight of isobutene and acrylonitrile in the mixture, and said methyl methacrylate being present in the mixture to the extent of not more than 50%, based on the total weight of monomers present in said mixture.

4. Process which comprises interpolymerizing, in aqueous emulsion, a mixture solely of isobutene, acrylonitrile, and butadiene-1,3, said isobutene being present in the mixture to the extent of from about 10% to about 90%, based on the total weight of isobutene and acrylonitrile in said mixture, and said butadiene being present to the extent of not more than 50%, based on the total weight of monomers in said mixture.

5. The process which comprises polymerizing, in aqueous emulsion, a mixture of isobutylene, acrylonitrile and methyl methacrylate as the sole polymerizable materials, said isobutylene being present in the mixture to the extent of from 20% to 80%, based on the total weight of isobutylene and acrylonitrile in the mixture, and said methyl methacrylate being present in the mixture to the extent of 15% to 50%, based on the total weight of monomers present in said mixture.

6. An interpolymer prepared by the polymerization of a mixture of isobutylene, acrylonitrile and methyl methacrylate as the sole polymerizable materials, said isobutylene being present in the mixture to the extent of from 20% to 80%, based on the total weight of isobutylene and acrylonitrile in the mixture, and said methyl methacrylate being present in the mixture to the extent of 15% to 50%, based on the total weight of monomers present in said mixture.

KENNETH C. EBERLY.
ROBERT J. REID.

REFERENCES CITED

The following references are of record in the file of this patent:

UNITED STATES PATENTS

| Number | Name | Date |
|---|---|---|
| 2,213,423 | Wiezevich | Sept. 3, 1940 |
| 2,241,900 | Brubaker | May 13, 1941 |
| 2,376,014 | Semon | May 15, 1945 |

Certificate of Correction

Patent No. 2,537,626　　　　　　　　　　　　　　　　January 9, 1951

KENNETH C. EBERLY ET AL.

It is hereby certified that error appears in the printed specification of the above numbered patent requiring correction as follows:

Columns 5 and 6, in the table, fourth column thereof, Run No. 3, per cent of the Catalyst $K_2S_2O_8$ for "0.7"; read *0.8*; column 7, line 12, for "amples" read *ample*;

and that the said Letters Patent should be read as corrected above, so that the same may conform to the record of the case in the Patent Office.

Signed and sealed this 10th day of April, A. D. 1951.

[SEAL]

THOMAS F. MURPHY,
*Assistant Commissioner of Patents.*